Patented July 4, 1950

2,513,327

UNITED STATES PATENT OFFICE 2,513,327

TREPONEMA PALLIDUM CULTURE AND PRODUCTS THEREOF

Rose R. Ichelson, Philadelphia, Pa., assignor of one-fourth to Edward Unterberger and one-fourth to Joseph G. Denny, Jr.

No Drawing. Application March 18, 1943, Serial No. 479,608

13 Claims. (Cl. 167—78)

My invention relates to the culture of micro-organisms in artificial media in vitro and the production of useful derivatives therefrom.

A leading object of my invention is the development of pure, pathogenic cultures of Treponema pallidum (Spirochaeta pallida) directly from human syphilomata in tissue-free liquid media in vitro and from which the micro-organisms may be readily segregated in quantity and form adequate for the evolution of useful derivatives therefrom which are useful in the diagnosis of syphilis. Brute strains of Treponema pallidum, as, for instance, from the rabbit or monkey, may, however, also be cultured, without loss of virulence, in the media which I have discovered and derivatives may be secured from such pathogenic cultures in accordance with my invention.

In a recent symposium of leading authorities on syphilis, published as Bulletin No. 6 (Syphilis) of the American Association for the Advancement of Science (The Science Press 1938) it is pointed out that "Spirochete pallida is a fragile parasite susceptible to many destructive agents in the environment, such as dryness, light, heat and cold; and it cannot live long away from the human body. Having neither intermediate host nor known encystment stage, it must make a quick leap from host to host or perish" (p. 36). "There is an extensive literature on the culturing of Sp. pallida, the best known procedure being that of Noguchi 1911. Published reports are conflicting, however, and for the present may be regarded with distrust. Until growth of the spirochete of syphilis in test tubes is a well established fact, it is improbable that the life cycle of the organism can be completely and satisfactorily demonstrated. Our experiences with rabbit inoculations to aid in determining the life cycle of Spirochete pallida have been far from satisfactory. If anything, they have confused the issue. There has been some difficulty in positively distinguishing the lesions of rabbit spirochetosis (Sp. cuniculi) from those of human syphilis in rabbits (Sp. pallida). Dr. Warthin did not consider the lesions produced in rabbits by strains of Sp. pallida to be characteristic nor comparable to those of human syphilis" (p. 51). "Syphilis of the rabbit is not entirely comparable to either acquired or congenital syphilis of man, but combines elements of both conditions" (p. 64). "Finally it should be mentioned that strains of Sp. pallida which have been carried in rabbits for long periods are still pathogenic for man, as is evidenced by occasional accidental infections" (p. 67). "Though Noguchi, Kolmer and others report that they have cultivated Sp. pallida in vitro, the process is unfamiliar and difficult. Real success in such cultivation may point the way to immunization" (p. 189).

I have attained real success in such cultivation over a period of years, with consistent success in the initial isolation of fresh strains of Treponema pallidum from humans, anaerobically in liquid media, and with the development of cultures from such initial strains which can be sub-cultured in the first and subsequent transfers in a more plentiful culture medium free from solids and contaminating substances and without loss of pathogenicity or virulence for many generations.

I have discovered that pure, pathogenic fresh strains or cultures of Treponema pallidum from human, as well as from brute, syphilomata may be initially propagated prolifically in vitro in a liquid culture medium comprising a major portion of human blood serum and a minor portion of hog blood; that pure, pathogenic sub-cultures of Treponema pallidum may be further propagated prolifically in vitro from an initial culture either in a like culture medium or in a culture medium comprising pure hog blood serum: and that the addition of small amounts of calcium chloride and glucose to both such media greatly increases the fecundity, motility and apparent vigor of the micro-organisms without apparent change in the morphology or pathogenicity thereof.

In preparing the primary culture medium, I preferably add a nutrient, say 0.1 gram of glucose, and 0.02 gram of calcium chloride (C. P.), to 100 c. c. of freshly obtained, human, serologically negative blood serum collected under sterile conditions. This mixture may be placed in small quanta, say 5 c. c., in ordinary cotton-stoppered, sterile culture tubes and the mixture in the stoppered tubes may be incubated in a water bath, at, say, 54° to 60° C. for 24 hours to inhibit antibodies, insure freedom from micro-organisms or spores and destroy the activity of complement.

100 c. c. of sterile hog blood is collected in, say, 10 c. c. of physiological salt solution (a 0.85 aqueous solution of sodium chloride) containing say, 1% sodium citrate or other mild anti-coagulant.

About one drop ($\frac{1}{16}$ c. c.) of the stabilized hog blood is mixed with 5 c. c. of the serologically negative, sterile, human blood serum in one of the culture tubes, and to this is added one drop of human chancre fluid or other syphilomata containing Treponema pallidum, and preferably free from blood or tissue. The culture media containing the inoculum is covered with a layer of equal parts of paraffin and yellow Vaseline; the tube is stoppered with sterile cotton plugs, covered with paraffin, and placed in an incubator at an incubating temperature, say 30° C. After from five to fourteen days under anaerobic incubating conditions, the multiplication of the Treponema pallidum becomes visually apparent, and after three to four weeks the growth becomes very heavy. The blood corpuscles or debris therefrom gradually settle toward the bottom and the Treponema pallida congregate in greatest numbers toward the top of the medium in the test tube during incubation, so that cultures may be withdrawn from the tube substantially free from any corpuscles or debris therefrom.

From this initial culture, sub-cultures may be developed in the same manner in further tubes containing a like culture medium, but for the production of useful derivatives the sub-cultures are preferably developed in a culture medium of hog blood serum free from tissue or corpuscles.

In making the hog blood serum, fresh hog blood is initially cooled, coagulated and centrifuged to separate the serum from the solids. The serum is kept cool and under sterile conditions until needed. When the serum is to be used as a culture medium, a small amount, say 0.02%, of calcium chloride, and a small amount of nutrient substance, say 0.1% of glucose, is added to the serum and the mixture heated in a culture tube to say 54° to 60° C. for a half hour or more. After cooling to say 35° C., a drop of the Treponema pallida culture previously developed in the compound of human blood serum and hog blood is added and the culture tube sealed as above described. The sub-cultures are incubated anaerobically at substantially the same temperature, for substantially the same time, and under substantially the same conditions, as the primary culture.

The sub-cultures, originating in vitro, appear to flourish and multiply in the culture medium having hog blood serum as its major constituent as well as the fresh strains, originating in vivo, flourish and multiply in the culture medium having human blood serum as its major constituent.

Sub-sub-cultures ad infinitum may be propagated in the same manner and in either culture medium without any morphological change, or loss of motility, or loss of virulence in the micro-organisms. When examined with the dark field microscope at any stage of culture or sub-culture, the micro-organisms exhibit the characteristic morphological features, movements and details of structure of pathogenic Treponema pallidum.

One drop of undiluted human syphilitic sera, when mixed with one drop of my culture of Treponema pallidum dispersed in physiological saline solution and killed by heat, and having a nephelometer concentration of, say, one hundred million Treponema pallidum per c. c., produces complete agglutination within four and a half to ten minutes, whereas negative sera, diluted or undiluted, produced no agglutination.

The injection into monkeys and rabbits of late sub-cultures of Treponema pallidum (39th sub-culture), made in accordance with my invention, infected them with syphilis, with resultant characteristic chancres in three to six weeks and syphilitic changes in the long bones. Wasserman tests on each animal before inoculation were negative but tests made eight to twelve weeks after chancre development showed positive.

I further found that when Treponema pallidum cultures were mixed with hog serum or blood, diluted or undiluted, the organisms became more active and did not clump or agglutinate, whereas upon the mixture of the same culture with equal amounts of diluted or undiluted sera of rabbits, guinea pigs, cattle, horses, or sheep, the organisms began to clump. While the Wasserman reaction from rabbits, guinea pigs and calves' blood could be positive, the Wasserman reactions from hog blood were always negative, and, since hogs cannot be infected with syphilis, it would appear that no anti-bodies are present in their blood which would interfere with the multiplication of Treponema pallidum, and that the unique position in mammalian physiology occupied by the metabolism of the hog, as well as the resistance of its blood serum to contaminating organisms and to hemolysis and its long retention of its natural biological properties, renders it peculiarly suitable for use in culture mediums.

Whatever the explanation, my researches and invention have resulted in real success in the prolific cultivation in vitro of virulent, pathogenic Treponema pallidum, free from contamination, with ease and certainty, and from strains originating in human, as well as in brute, sources.

In the production of derivatives from the Treponema pallidum cultures hereinbefore described, I may use the cultures grown in either the primary culture medium or in the secondary culture medium, but preferably use the latter because of the absence of blood corpuscles or debris therefrom present in the concentration of Treponema pallidum.

When a sufficient growth of the Treponema pallida has accumulated, the portion of the culture medium containing them may be decanted into a high speed centrifuge and centrifuged at high speed for an hour to separate the fluid from the solids. The solids are washed several times with physiological saline solution until all traces of the original culture medium are gone.

As above noted, the cultures originating in human strains or in brute strains of Treponema pallidum and cultured in human blood serum and hog blood or in hog blood serum may be rendered suitable for agglutination tests for syphilis by washing away all traces of the culture media and heating the micro-organisms in a physiological saline solution at 65° C. for one hour; the product having a nephelometer density of approximately one hundred million organisms per c. c.

A similar but more concentrated dispersion of Treponema pallidum killed by heat in physiological saline solution, with 0.25% tri-cresol added as a preservative, was used by me as a vaccine to immunize to syphilis four healthy serologically negative monkeys. Each animal received six intravenous injections, beginning with a dose of 0.1 c. c. of vaccine having a nephelometer density of one billion Treponema pallidum per c. c. of vaccine. Each succeeding dose was increased 0.1 c. c. until the final dose of 0.6 c. c. was given. Ninety days after the last injections, the four vaccinated monkeys and two non-vaccinated, healthy serologically negative control monkeys were inoculated intratesticularly with fresh syphilomata obtained from human syphilitic lesions. The non-vaccinated monkeys developed chancres in five to six weeks after inoculation. No lesions or other syphilitic symptoms developed in the vaccinated monkeys, which were examined every week for a year.

A useful derivative may be made by mixing the centrifuged and washed cultures of *Treponema pallidum*, developed as above described, in a nutrient medium, such as sterile 1% glucose bouillon, pH 7.4, and anaerobically incubating for six weeks during which all the organisms appear to die. A toxic derivative is thereby produced, probably by excretion or the formation of metabolic products. If no contamination by foreign organisms appears in the medium at the end of this time, the incubated suspension is filtered through a fine Berkfeld filter and tested for sterility, aerobically and anaerobically, by incubation in ordinary culture media and in blood sera culture media hereinbefore described. If after four weeks incubation, the culture media still remain sterile, the filtrate, which was stored under refrigerating conditions, may be used.

In giving intra-dermal injections of such filtrate to monkeys and rabbits, the abdomens of suspected and healthy animals were shaved and washed with alcohol. One minim of filtrate was injected intra-dermally at one side of each clean area and a similar amount of glucose bouillon was injected intra-dermally at the opposite side of each clean area as a control. The syphilitic infected animals gave a positive reaction by the development of red wheals about 1'' to 1½'' in diameter around the point of injection of the filtrate. No redness developed at the points of injection of the glucose bouillon in the infected animals or at the points of injection of the filtrate or of the glucose bouillon in non-infected animals.

It will also be understood that the production in quantity of pure cultures of direct human strains of *Treponema pallidum* in vitro free from tissue contamination and without the morphological and pathogenic changes incident to the growth of and propagation of such organisms in vivo in brutes, affords opportunity for studies of the life cycle of the organism and of the effect thereon of specifics for the control or extermination thereof.

Having described my invention, I claim:

1. In the manufacture of derivatives of *Treponema pallidum*, the step which comprises incubating *Treponema pallidum* in a liquid culture medium comprising principally human blood serum and containing a small portion of hog blood.

2. The method of making a product which comprises incubating *Treponema pallidum* in a culture medium comprising a major portion of human blood serum and a small portion of hog blood, segregating the cultured *Treponema pallidum* from said culture medium, incubating segregated *Treponema pallidum* in a nutrient medium until they die naturally, and filtering the nutrient medium from the *Treponema pallidum*.

3. The method of culturing *Treponema pallidum* which comprises incubating them in a liquid culture medium free from tissue and whose principal constituent is human blood serum and which includes a small amount of hog blood.

4. The method of culturing *Treponema pallidum* which comprises incubating them in a culture medium nearly all of which consists of human blood serum, and which includes a small portion of hog blood.

5. The method of culturing *Treponema pallidum* which comprises incubating them in a culture medium consisting almost entirely of human blood serum and which includes a small quantity of hog blood and minute quantities of a nutrient and a preservative.

6. A micro-organism culture medium comprising human blood serum and hog blood.

7. A micro-organism culture medium free from tissue and comprising a major portion of human blood serum and a minor portion of hog blood.

8. A micro-organism culture medium comprising a major portion of hog blood serum and a small portion of calcium chloride.

9. In the method of culturing *Treponema pallidum* of a human strain, the steps which comprise anoerobically incubating *Treponema pallidum* derived directly from a human host in a medium having serologically negative, sterile, human blood serum as its predominant constituent and hog blood as a minor constituent and a nutrient and a preservative as minute constituents, and until the *Treponema pallidum* and corpuscles of said blood tend to separate, withdrawing separated *Treponema pallidum* from the upper portion medium and incubating them in a medium having hog blood serum as its principal constituent and a nutrient and a preservative as minute constituents.

10. In the method of culturing *Treponema* pallidum of a human strain, the steps which comprise incubating *Treponema pallidum* derived directly from a human host in a medium composed principally of serologically negative sterile human blood serum preheated sufficiently to inhibit antibodies and destroy the activity of complement and containing a small portion of hog blood and smaller portions of calcium chloride and glucose.

11. In the method of culturing *Treponema pallidum* of a human strain, the steps which comprise anoerobically incubating *Treponema pallidum* derived directly from a human host in a liquid culture medium having human blood serum as its major constituent and hog blood as a minor constituent and being substantially free from tissue and water, and transferring a culture from said medium to a culture medium consisting primarily of hog blood serum and incubating the transferred culture therein.

12. In the method of culturing *Treponema pallidum* of a human strain, the steps which comprise incubating *Treponema pallidum* derived directly from a human host in a liquid culture medium having human blood serum as its major constituent and hog blood as a minor constituent and substantially free from tissue and water, and transferring virulent cultures from said medium to a culture medium consisting principally of pure hog blood serum and incubating the transferred culture therein, at least one of said mediums containing minute quantities of calcium chloride and a nutrient.

13. The method of culturing *Treponema pallidum* of a human strain which comprises incubating *Treponema pallidum* derived directly from a human host in a medium having serologically negative, sterile human blood serum as its principal constituent, and hog blood, glucose and sodium chloride as minor constituents.

ROSE R. ICHELSON.

(References on following page)

REFERENCES CITED

The following references are of record in the file of this patent:

UNITED STATES PATENTS

| Number | Name | Date |
|---|---|---|
| 1,384,444 | Frazier | July 12, 1921 |
| 2,004,673 | Pieper | June 11, 1935 |
| 2,255,079 | Morrison | Sept. 9, 1941 |
| 2,285,708 | Glynn | June 9, 1942 |
| 2,293,890 | Dutky | Aug. 25, 1942 |
| 2,298,561 | Hendrickson | Oct. 13, 1942 |

FOREIGN PATENTS

| Number | Country | Date |
|---|---|---|
| 626,628 | Germany | Feb. 29, 1936 |

OTHER REFERENCES

"A Compilation of Culture Media," Levine and Schoenlein, 1930, pages 202, 203, 368 and 399. (Copy in Div. 43.)

J. Infectious Diseases, 34, 223–226 (1934). (Copy in Div. 43.)

Kentucky Medical J., 38, 10 (1940). (Copy in Div. 43.)

"Compilation of Culture Media . . . ," Levine et al. (1930), pages 694 and 695. (Copy in Division 63.)

"A Compilation of Culture Media," by Levine et al., 1930, pages 638, 641, 786, 787. (Copy in Div. 63.)

Textbook of Bacteriology by Zinsser et al., 7th ed., 1935, pages 338, 339, 792 to 796, 1131, 1132.

Bacteriology and Allied Subjects, by Louis Gershenfeld, 1945, page 496. (Copy in Division 43.)